(12) United States Patent
Arvidson et al.

(10) Patent No.: US 6,776,948 B1
(45) Date of Patent: Aug. 17, 2004

(54) METHOD AND APPARATUS FOR APPLYING COATINGS OF MOLTEN THERMOPLASTIC MATERIAL OVER CLOSED PORE ELASTOMER FOAM SUBSTRATES

(75) Inventors: Richard T. Arvidson, Fairport, NY (US); Mark A. Rogers, Nottingham, NH (US)

(73) Assignee: Ultrafab, Inc., Farmington, NY (US)

( * ) Notice: Subject to any disclaimer, the term of this patent is extended or adjusted under 35 U.S.C. 154(b) by 99 days.

(21) Appl. No.: 09/915,442

(22) Filed: Jul. 26, 2001

(51) Int. Cl.⁷ .............................................. B29C 67/20
(52) U.S. Cl. .................... 264/321; 264/48; 264/344; 427/316
(58) Field of Search ........................ 427/316; 264/321, 264/48, 129, 344, 45.6, 259

(56) References Cited

U.S. PATENT DOCUMENTS

| | | | |
|---|---|---|---|
| 1,805,145 A | | 5/1931 | Koops |
| 1,960,137 A | | 5/1934 | Brown |
| 3,167,827 A | | 2/1965 | Alley et al. |
| 3,206,323 A | | 9/1965 | Miller et al. |
| 3,503,822 A | * | 3/1970 | Turkewitsch ................ 156/242 |
| 3,619,246 A | * | 11/1971 | Bragole ...................... 427/316 |
| 3,836,297 A | | 9/1974 | Weaver |
| 3,841,807 A | | 10/1974 | Weaver |
| 3,928,521 A | | 12/1975 | Haren et al. |
| 4,118,166 A | | 10/1978 | Bartrum |
| 4,130,535 A | | 12/1978 | Coran et al. |
| 4,167,431 A | * | 9/1979 | Wong ..................... 156/244.11 |
| 4,181,780 A | | 1/1980 | Brenner et al. |
| 4,204,821 A | | 5/1980 | Gauchel et al. |
| 4,238,260 A | | 12/1980 | Washkewicz |
| 4,252,933 A | * | 2/1981 | Sumida ........................ 528/33 |
| 4,258,646 A | | 3/1981 | Kloczewski et al. |
| 4,296,062 A | | 10/1981 | Gauchel et al. |
| 4,305,900 A | | 12/1981 | Cavalli |
| 4,328,273 A | | 5/1982 | Yackiw |

(List continued on next page.)

FOREIGN PATENT DOCUMENTS

| | | |
|---|---|---|
| FR | 2200109 | 4/1974 |
| FR | 2310207 | 3/1976 |
| FR | 2572678 | 9/1986 |
| GB | 1061971 | 3/1967 |
| GB | 1545511 | 5/1979 |
| GB | 1595214 | 8/1981 |
| JP | 59-54535 | 3/1984 |

OTHER PUBLICATIONS

Levy, Sidney, Plastics Extrusion Technology Handbook, Industrial Press, Inc., New York, New York (1981) pp. 178–183.

Levy, Sidney, Handbook of Profile Coextrusion and Covering, Tooling and Systems Design, Construction, Operation, LaVerne, CA., (1987) pp. 1–64.

*Primary Examiner*—Allan R. Kuhns
(74) *Attorney, Agent, or Firm*—Kenneth J. Lukacher; Martin Lukacher

(57) ABSTRACT

In order to make weather seals from closed cell elastomer foam material, molten plastic is extruded over a substrate of the foam material. Surface reactions during extrusion are avoided by continuously pulling the substrate through an oven chamber to degas (and remove moisture from) the material at least on its outside to a limiting thickness of the order of 10–30 mil to form a skin or crust. The extrusion of the over-coating is carried out to form a sleeve while the substrate is still hot. Since the skin is a degassed region on the outside of the foam substrate, reactions which may cause blistering and prevent the extrusion of a smooth and firmly adhering skin are avoided. The substrate material is preferably a thermosetting EPDM rubber closed cell foam, and the over coating material is a thermoplastic elastomer (TPE).

18 Claims, 5 Drawing Sheets

U.S. PATENT DOCUMENTS

| | | |
|---|---|---|
| 4,518,557 A | 5/1985 | Wecker |
| 4,535,564 A | 8/1985 | Yackiw |
| 4,537,825 A | 8/1985 | Yardley |
| 4,538,380 A | 9/1985 | Colliander |
| 4,656,785 A | 4/1987 | Yackiw |
| 4,898,760 A | 2/1990 | Halberstadt et al. |
| 5,070,111 A | 12/1991 | Dumbauld |
| 5,192,586 A | 3/1993 | Mertinooke et al. |
| 5,393,796 A | 2/1995 | Halberstadt et al. |
| 5,415,822 A | 5/1995 | Cook |
| 5,536,537 A * | 7/1996 | Mizushima et al. ........ 427/387 |
| 5,686,165 A | 11/1997 | Cook |
| 5,700,845 A | 12/1997 | Chung et al. |
| 5,728,406 A | 3/1998 | Halberstadt et al. |
| 5,766,703 A * | 6/1998 | Mori et al. ................... 428/31 |

\* cited by examiner ical view of the
METHOD AND APPARATUS FOR APPLYING COATINGS OF MOLTEN THERMOPLASTIC MATERIAL OVER CLOSED PORE ELASTOMER FOAM SUBSTRATES

DESCRIPTION

The present invention relates to methods and apparatus for over-coating closed cell elastomeric foam material without engendering reactions which may cause blistering or bubbling at the surface of the foam during coating. The invention is especially suitable for use in making foam weather seals.

Weather seals have been made of closed-cell plastic foam material which are over-coated to form a skin having a lower coefficient of friction than the foam material, see, for example, the following patents: Waskewicz, U.S. Pat. No. 4,238,260, issued Dec. 9, 1982; Yackiw, U.S. Pat. No. 4,328,273, issued May 4, 1982; Yardley, U.S. Pat. No. 4,537,825, issued Aug. 27, 1985; Yackiw, U.S. Pat. No. 4,535,564, issued Aug. 29, 1985; Collinder, U.S. Pat. No. 4,538,380, issued Sep. 3, 1985; Yackiw, U.S. Pat. No. 4,656,785, issued Apr. 14, 1987; and Mertinooke, U.S. Pat. No. 5,192,586, issued Mar. 9, 1993.

It has been found that when the coating is over preformed plastic or thermoset elastomer foam material such as closed-cell EPDM rubber, reactions occur during extrusion which give rise to bubbles and poor adhesion of the coating. Such rubbers have been developed in the past, see, for example, Brenner, U.S. Pat. No. 4,181,780, issued Jan. 1, 1980, however, neither the problem caused by the extrusion of the molten plastic for over-coating has not been either addressed or solved.

Accordingly, it is the principal object of the invention to provide improved methods and apparatus for making weather seals utilizing flexible strips (preferably cylinders or tubes) of closed-cell foam material such as thermosetting EPDM.

It is a further object of the present invention to provide improved methods and apparatus for over-coating a skin of plastic material by extrusion thereof on a closed-cell foam substrate, which is operative to raise the temperature of the substrate above a temperature critical to induce off-gassing of any materials or moisture in the pores thereby substantially eliminating the release of gas from the pores during over-coating, which can affect the quality of the coating.

It is still a further object of the present invention to provide an improved method of over-coating closed-cell foam materials which enables such materials to be prefabricated and unwound from reels into an extruder which carries out the over-coating process.

It is still a further object of the present invention to provide improved methods and apparatus for over-coating foam material in the production of weather-stripping or other products using the foam material by pre-curing, pre-heating or out-gassing a surface layer of the foam while the foam is fed through an oven chamber through which heated air is blown.

Briefly described, a weather seal made in accordance with the invention has a flexible foam substrate which prior to the extrusion of a skin of molten plastic material is heated to outgas at least a surface layer thereof. This layer is a crust which is essentially devoid of cells from which gas can be released. Accordingly, during extrusion and over-coating, the foam substrate is essentially unreactive with the skin material and the quality of the skin as regards to its adhesion to the substrate and smoothness is improved.

BRIEF DESCRIPTION OF THE DRAWINGS

The forgoing and other objects features and advantages of the invention, as well as a presently preferred embodiment of the apparatus for carrying out the invention will become more apparent from a reading of the following description in connection with the accompanying drawings in which.

DETAILED DESCRIPTION OF THE INVENTION

Figure 1:
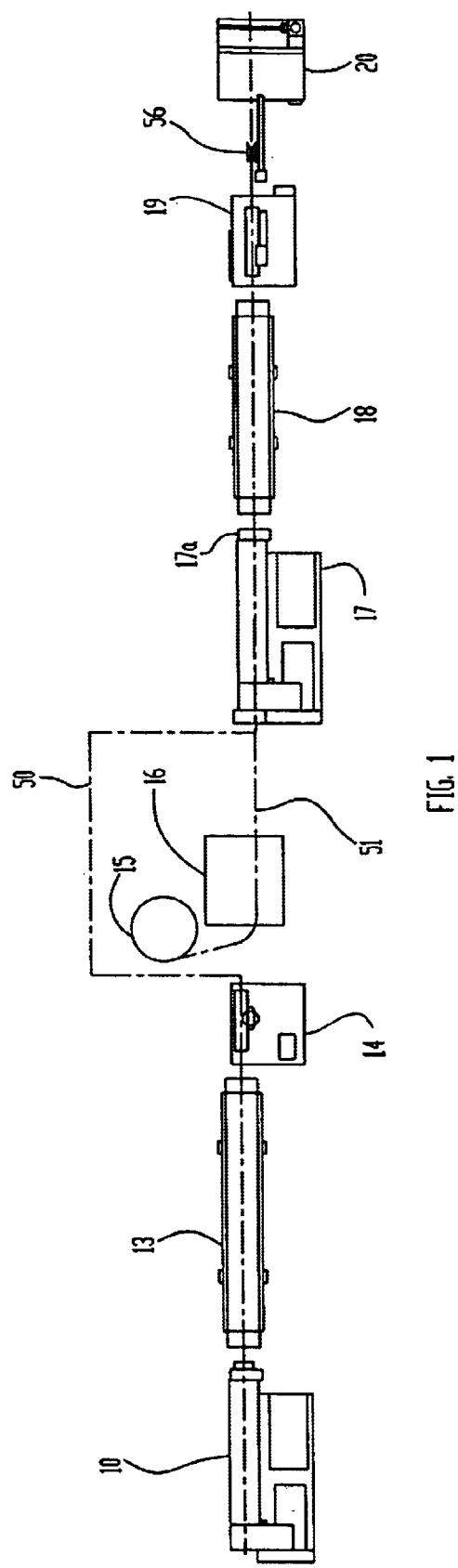
FIG. 1 is a block diagram schematically illustrating an embodiment of the invention.
Figure 5:
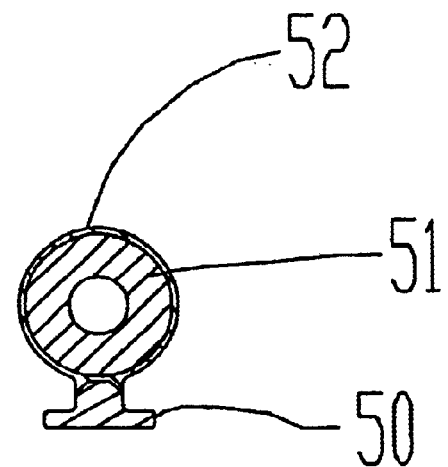
FIG. 5 is a cross-section of the weather seal product as it is wound on the finished product reel for shipment to the customer.

Referring to FIG. 1, there is shown a first extruder 10 which extrudes an attachment member 50 which is part of the finished weather seal (see FIG. 5). The attachment member is illustrated as a T-shaped strip 50 of plastic material, suitably polypropylene, which is inserted in a T-slot which holds the weather seal in a window frame or jam in a manner, as is conventional in fenestration applications. The attachment strip is cooled in a water bath 13 and is advanced along a path through the process by a puller 14, which may be provided by a pair of belts which engage the strip 50 on opposite sides thereof. The strip 50 bypasses the process which is provided in accordance with a feature of this invention for handling the thermosetting foam elastomer 51, which is the core or substrate to which the attachment strip 50 and the rest of the material providing the weather seal is secured. The attachment member 50 proceeds to an extruder 17 which attaches the strip 50 to the foam substrate and applies a coating 52 which is of a material that protects the foam and serves as a low-friction skin (the coefficient of friction of the skin 52 being less than the coefficient of friction of the foam substrate 51), as shown in FIG. 5.

Figure 3:
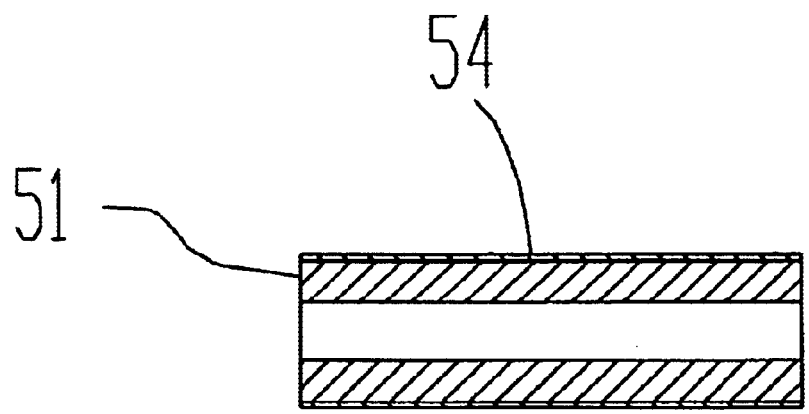
FIG. 3 is a fragmentary cross-sectional view of the closed-foam substrate after preheating and outgassing to form a crust or skin.
Figure 4:
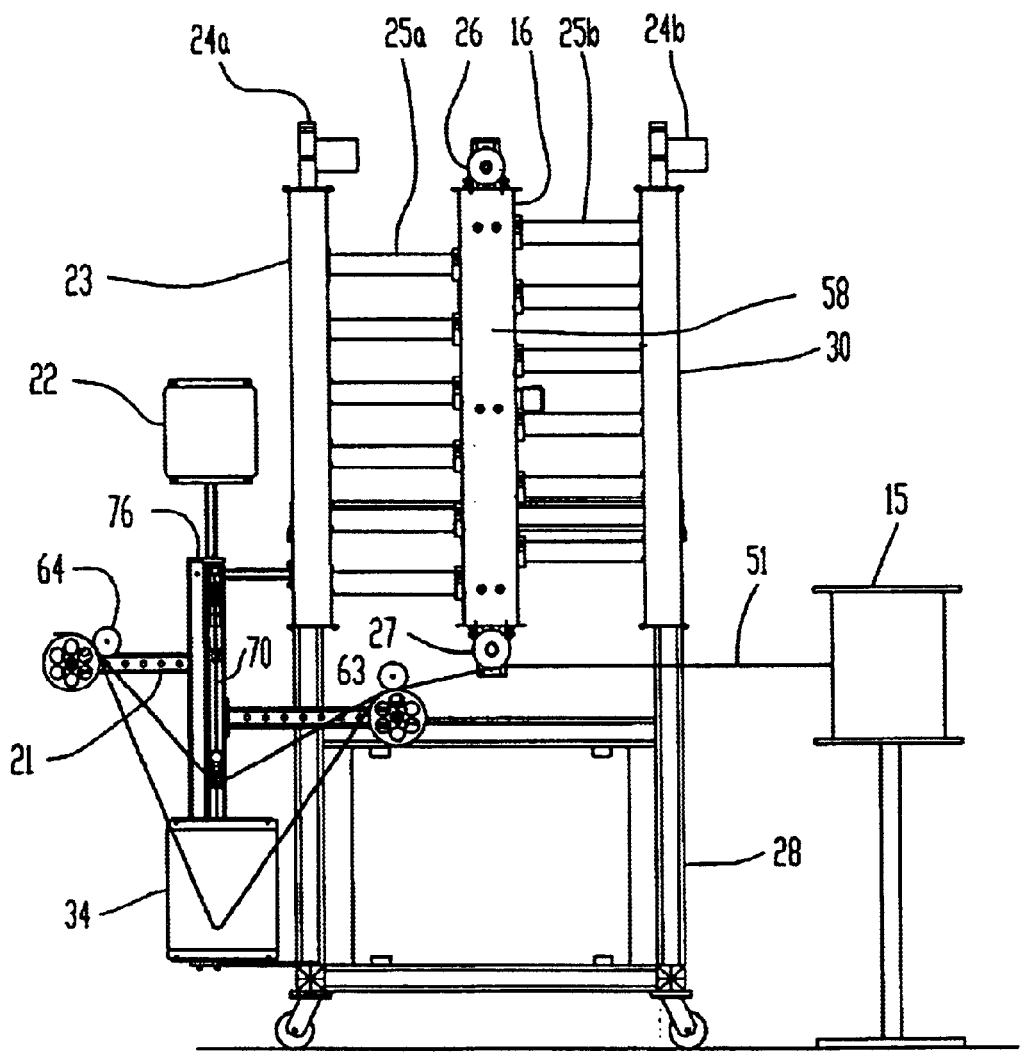
FIG. 4 is a front elevational view of the apparatus shown in FIG. 2 taken from the right side.

The foam substrate 51 is prefabricated, and is in the form of a cylindrical body, preferably a tube 51, as shown in FIG. 3. The tube is wound on a reel 15. The reel 15 is also shown in FIG. 4. The foam substrate 51 is preferably a thermosetting, elastomeric (rubber) foam material. A suitable foam is a closed-cell, non-oil resistant grade 2 EPDM rubber. This material is defined by standard ASTM D-1056. It may have a compression load deflection of from 3 to 15 pounds per foot at 50% of its outer diameter. It will be appreciated, of course, that the material used for the tube may be of different sizes. The size may vary from 50 mils to 600 mils in diameter (O.D.). The wall thickness of the tube may vary from approximately 25 mils to 300 mils. The cross-section of the substrate is preferably tubular, however, it may be a solid cylinder or have other cross-sectional shapes such as square, hexagonal or diamond shape, depending upon the application for the weather seal. The material of the coating 52, which is applied by the extruder 17 is preferably a thermoplastic elastomer (TPE). It has been found that a rubberized polypropylene is a suitable TPE material.

The foam substrate 51, is outgassed in an oven 16. This oven is part of the apparatus shown in greater detail in FIGS. 2, 4 and 6. The apparatus assures a sufficient dwell time in the oven and a sufficient temperature to induce off-gassing in a surface layer or crust 54, as shown in FIG. 3. This crust may be approximately 10–30 mil thick.

While the invention is not limited to any theory for the formation of the crust, it is presently believed that the crust is formed as follows. Due to the heating to a critical temperature, say approximately 230° F., the foam core expands, that is its outer diameter increases approximately 10% to 30% depending on the size and composition of the foam and the process speed and temperature. In the process of increasing diameter, volatile gasses and moisture in the pores in an outer layer 54 of the foam are released. The remaining foam is without pores and therefore has a texture somewhat like the crust 54, as shown in FIG. 3.

Upon leaving the oven 16, the material cools slightly and may, for example, be about 200° F. upon reaching the extrusion dye 17a of the extruder 17. The attachment strip 50 is combined and fed along the outside of the foam substrate 51, reaching approximately to the outer surface of the substrate as shown in FIG. 5. Then, the TPE in molten form is extruded to form the coating 52. The molten TPE may, for example, be about 400° F. Because of the crust, and the elevated temperature of the foam substrate 51, there is provided a stable region which is not reactive with the over-coating TPE material. Accordingly, there is no blistering or bubbling as would occur if the foam were not outgassed prior to overcoating in the extruder 17. The coating 52 obtained is therefore smooth and adheres completely to the substrate 51 thereby providing a product of increased quality over that which would be provided without the oven and outgassing process provided by the invention.

The overcoated substrate 51, with the attachment strip 50 secured thereto by the overcoating 52, is then passed through a water bath 18 and cooled, the cooled, totally solidified, weather seal is advanced by means of a puller mechanism 19 which may be similar to the puller 14. The weather seal is then fed over a dancer 56 and grabbed by a winding mechanism 20 which winds the weather seal product on a spool for shipment to the customer.

Figure 2:
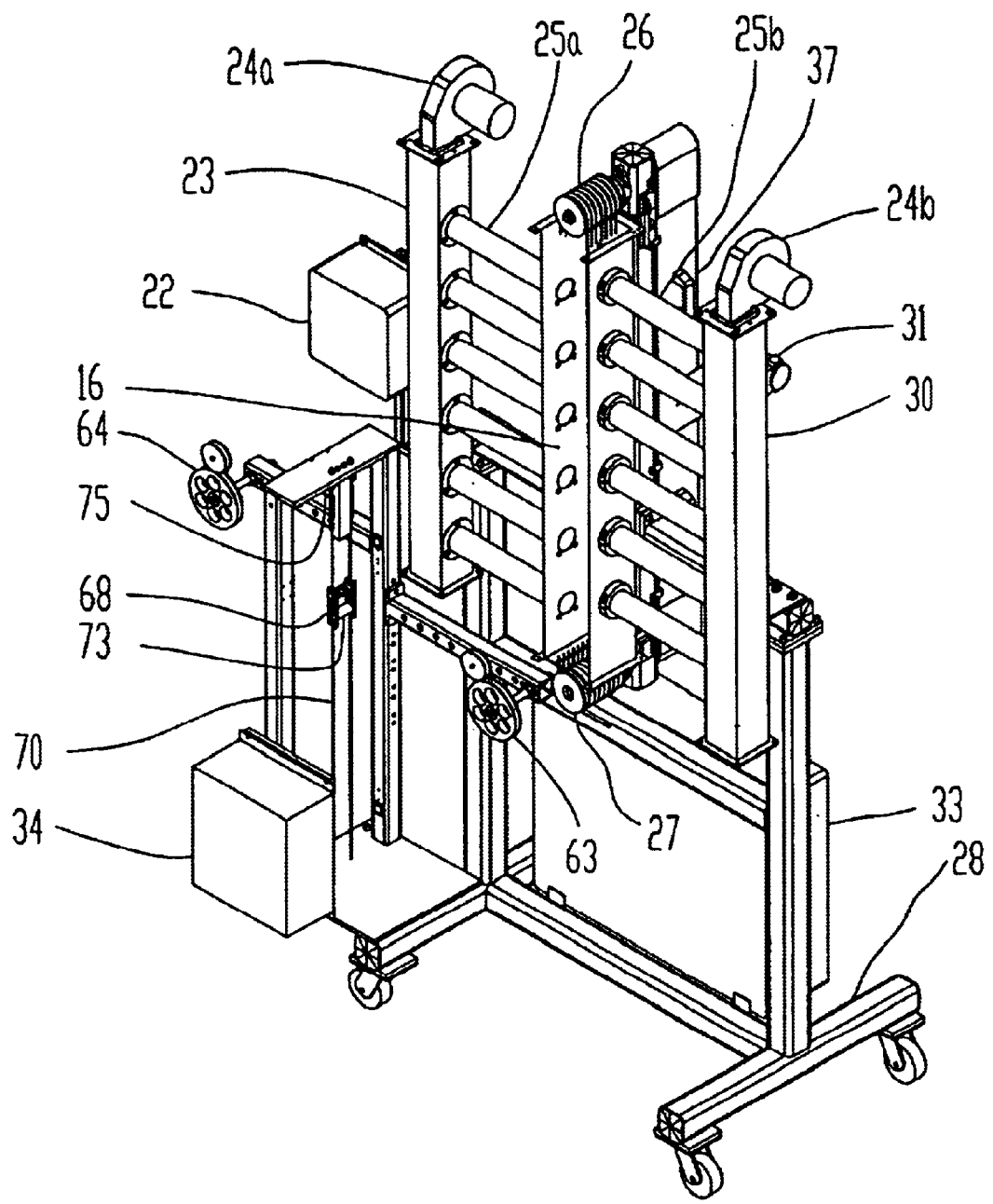
FIG. 2 is a perspective view of the apparatus for driving and preheating a closed-foam plastic elastomeric substrate prior to extrusion of a plastic over-coating thereon.
Figure 6:
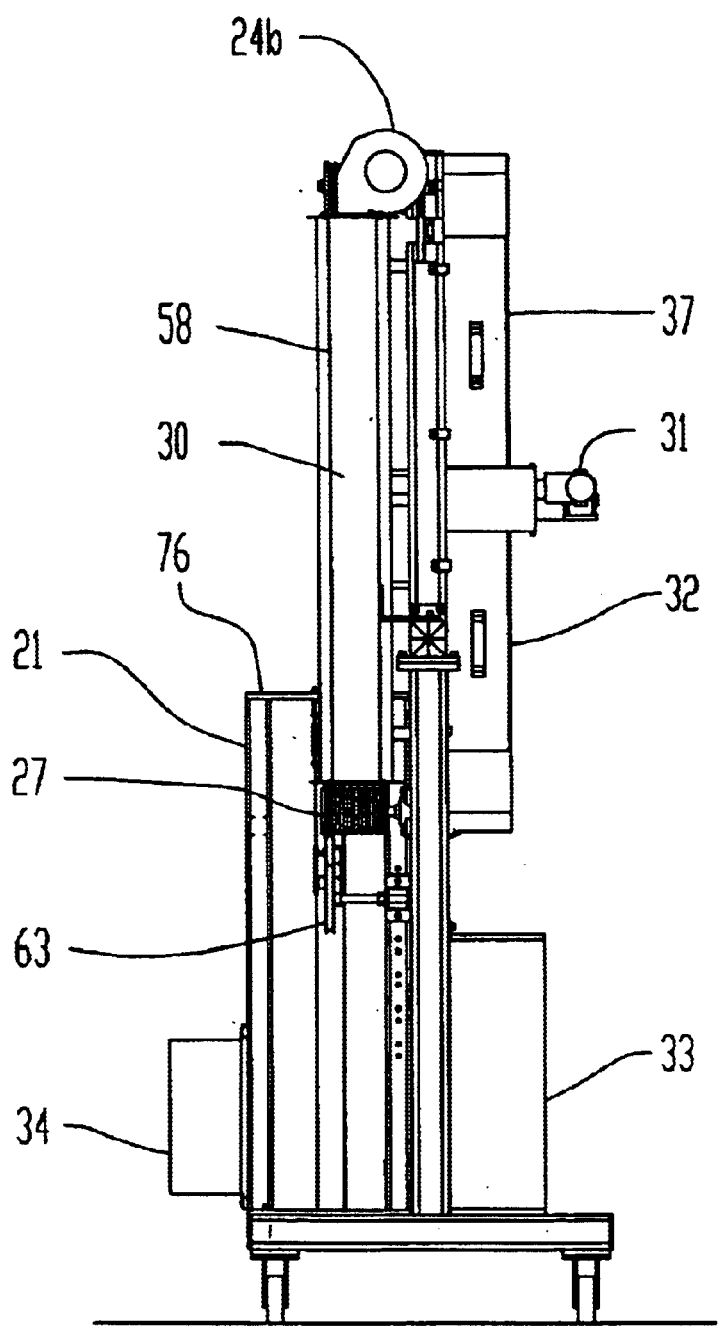
FIG. 6 is a side elevation of the apparatus shown in FIG. 2.

Referring to FIGS. 2, 4 and 6, the apparatus which provides the oven 16 is shown in greater detail. The oven itself, is a U-shaped, sheet-metal box. The metal may preferably be stainless steel to withstand the temperatures involved. The box in operation is closed by a cover 58, which is not shown in FIG. 2 to illustrate the internals of the oven. The oven is open at the bottom and also at the top so that a plurality of turns of the substrate may be reeled through the oven. These turns are provided by pulleys 26 and 27 at opposite ends of the oven. These pulleys are driven positively by a drive mechanism including a motor. 31 which is connected to a drive pulley system including belts within guards 32 and 37. The belts are connected to the shaft of the pulley. In a typical embodiment, the length of the oven chamber 16 may be six feet and there may be seven turns of the substrate foam around the pulleys. The feed rate of the substrate may be sixty feet per minute. This rate may be kept constant and the temperature in the oven changed in order to accommodate different sizes of substrate, that is the temperature may be higher for larger diameter substrate and lower for smaller diameter substrate.

The oven is heated by a forced air blower system. A pair of centrifugal blowers 24a and 24b are situated at the top of manifolds 23 and 30. The manifolds are of a length corresponding to the length of the oven chamber 16. The manifolds are connected to the oven chamber by tubes 25a and 25b which are spaced from each other longitudinally along the sides of the oven chamber to provide a more or less uniform flow of air into the oven chamber. The tubes 25a and 25b may be electrically heated by heater wire on the inside thereof. The controls for the drive motors and heaters may be in a box 22 which is electrically connected to circuitry in enclosures 33 and 34. The manifolds and the enclosures are mounted on a movable framework 28. The framework is movable by virtue of lower legs thereof being mounted on casters.

The substrate is supplied from a reel 15 which is mounted on a journal having sufficient friction to provide back tension against the force applied to the substrate by the pulley 26 and 27 and its motor drive 31. In the event that the substrate is fragile, the spool 15 may be motor driven via a clutch which provides the necessary back tension.

Incoming substrate 51 is first wound around the lower pulley 27. The outgoing substrate after heating also leaves at the lower pulley 27. The substrate is then fed to a tensioner 21. A pair of rollers having peripherys in contact but with grooves to permit the substrate 51 to pass are located and the input and output sides 63 and 64 of the tensioner 21. The tensioner is therefore between the oven and the extruder as will be further apparent from FIG. 1.

The purpose of the tensioner is to minimize the force applied to the substrate foam 51 by the puller 19. To this end, the tensioner has a weighted shuttle 68 which rides on wire guides 70. The shuttle has a roller 73 which contacts the substrate 51. As the tension increases, a loop of the substrate 51 between the side rollers 63 and 64 on opposite sides of the shuttle changes in size. When the tension increases, the shuttle moves upward, and when the tension decreases, the shuttle increases the size of the loop. An ultrasonic sensor 75 measures the distance between the shuttle and the face of the sensor. If the shuttle is above an upper limit, the sensor detects this condition and increases the speed of the motor 31 which drives the pulleys 26 and 27 so as to increase the size of the loop. If the shuttle is below a lower limit, the sensor detects this condition and decreases the speed of the motor 31 which drives the pulleys 26 and 27 so as to decrease the size of the loop. The tension of the foam substrate 51 is regulated by the weight of the shuttle which can be altered to handle very flimsy, small-diameter substrate material as well as large diameter material.

From the foregoing description, it will be apparent that there has been provided improved methods and apparatus for fabricating weather seals of the type utilizing elastomeric (rubber) foam substrates which are coated with a skin to provide the weather seal. Variations and modifications in the herein described methods and apparatus will undoubtedly suggest themselves to those skilled in the art, such as the use of open cell elastomeric foam substrates or the co-fabrication of the foam substrate during the fabrication of the weather seal. Accordingly, the foregoing description should be taken as illustrative and not in a limiting sense.

What is claimed is:

1. In a method of making a weather seal having a flexible foam substrate over which a coating of plastic material is extruded while the plastic coating material is molten to provide a skin over the substrate, the improvement comprising the step of heating the substrate prior to extrusion of said molten material to form a layer which is essentially unreactive with said molten skin during extrusion.

2. The method according to claim 1, wherein said heating step is carried out to provide a crust on the surface of said substrate which is essentially pore-free.

3. The method according to claim 2, wherein said crust is about 30 mil thick.

4. The method according to claim 1, wherein said heating step is carried out for sufficient time and at sufficient temperature to precure said layer of said foam on the surface thereof.

5. The method according to claim 1, wherein said foam is of thermosetting material.

6. The method according to claim 1, wherein said foam is EPDM.

7. The method according to claim 1, wherein said foam is a closed-cell elastomeric material of cylindrical shape having an outside diameter of from about 50 to 600 mils.

8. The method according to claim 7, wherein said cylinder is a tube having a wall thickness inwardly from said outside diameter from about 25 to about 300 mils.

9. The method according to claim 1, wherein said heating step is carried out to substantially outgas said foam at least in the thickness of said layer.

10. The method according to claim 9, wherein said extrusion step is carried out while said foam is still hot from the heating thereof.

11. The method according to claim 12, wherein said foam is about 200° F. during extrusion of said coating thereon.

12. The method according to claim 1, wherein said heating step is carried out by the steps comprising feeding said substrate through an extruder where said coating is applied thereto from a supply of said molten material, locating an oven upstream of said extruder, through which said substrate moves along a path over which said substrate travels to said extruder during said feeding step.

13. The method according to claim 12, wherein said heating step is carried out by the further step of forcing heated air through said oven to contact said substrate therein.

14. The method according to claim 13, wherein said heating step is carried out by the further step of maintaining a plurality of turns of said substrate lengthwise in said oven while continuously reeling said substrate through said oven.

15. The method according to claim 13, wherein said heating step further comprises providing a sufficient volume of moving heated air in said oven passing over and in contact with said substrate by blowing pressurized air from at least one manifold, said manifold and said oven having corresponding lengths, communicating said air from said manifold to said oven via a plurality of heated passageways which raise the temperature of said air to provide heated air to said oven, and permitting said air to flow continuously through said oven.

16. The method according to claim 14, wherein said reeling step is carried out by winding said plurality of turns of said substrate around pulleys at opposite ends of said oven, and driving said pulleys to reels that turn at such rate to provide sufficient dwell time in said oven for said substrate to form said crust, and further comprising the step of tensioning said substrate between one of said pulleys from which said substrate travels to said extruder and said extruder.

17. A method of making a weather seal having a substrate of closed pore elastomer foam, said substrate having a coating of thermoplastic material extruded over the substrate, which method comprises the steps of applying heat to the external surface of said substrate prior to extrusion of said coating to form a layer which is essentially unreactive on the surface of said substrate, said heating step being carried out without affecting the closed pore foam characteristic of said substrate under said layer.

18. The method according to claim 17 wherein said thermosetting closed pore foam material is precured before said heating step is carried out.

* * * * *